Feb. 9, 1960 C. L. RHODES 2,924,167
APPARATUS FOR COOKING WIENERS OR THE LIKE
Filed July 18, 1958 2 Sheets-Sheet 1
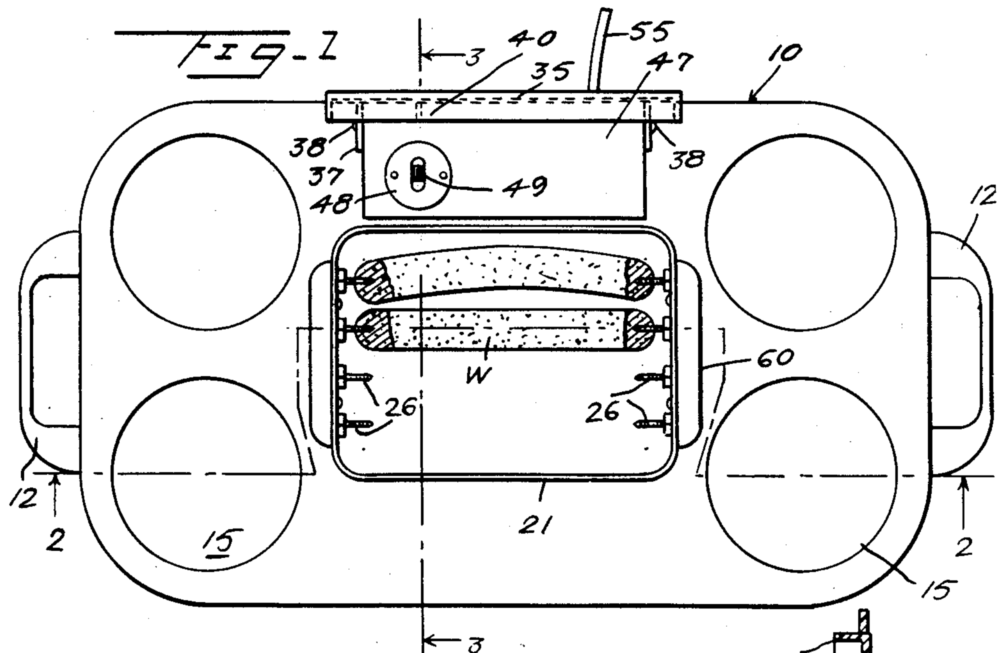
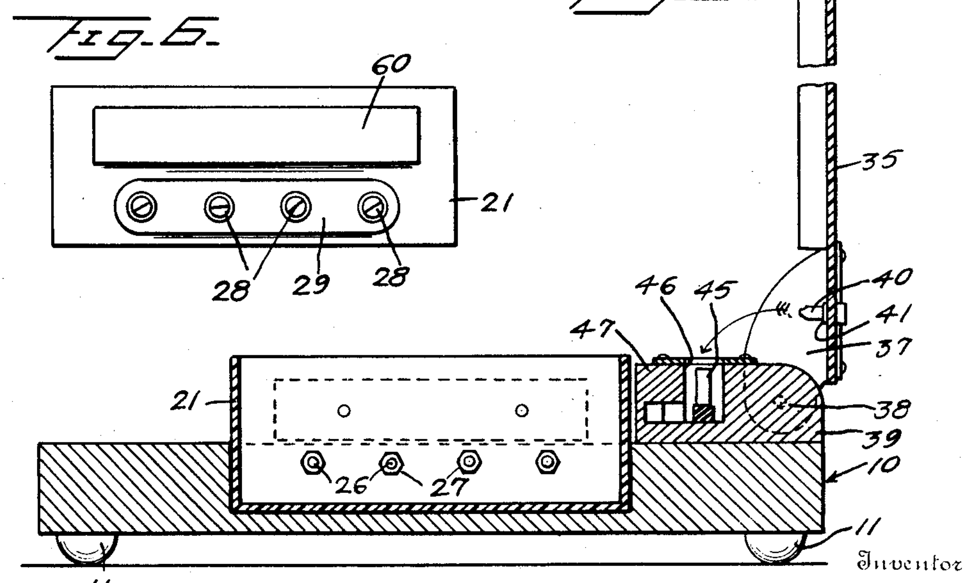
Inventor
Curtis Lee Rhodes
By C. A. Snow & Co.
Attorneys.

Feb. 9, 1960 C. L. RHODES 2,924,167
APPARATUS FOR COOKING WIENERS OR THE LIKE
Filed July 18, 1958 2 Sheets-Sheet 2
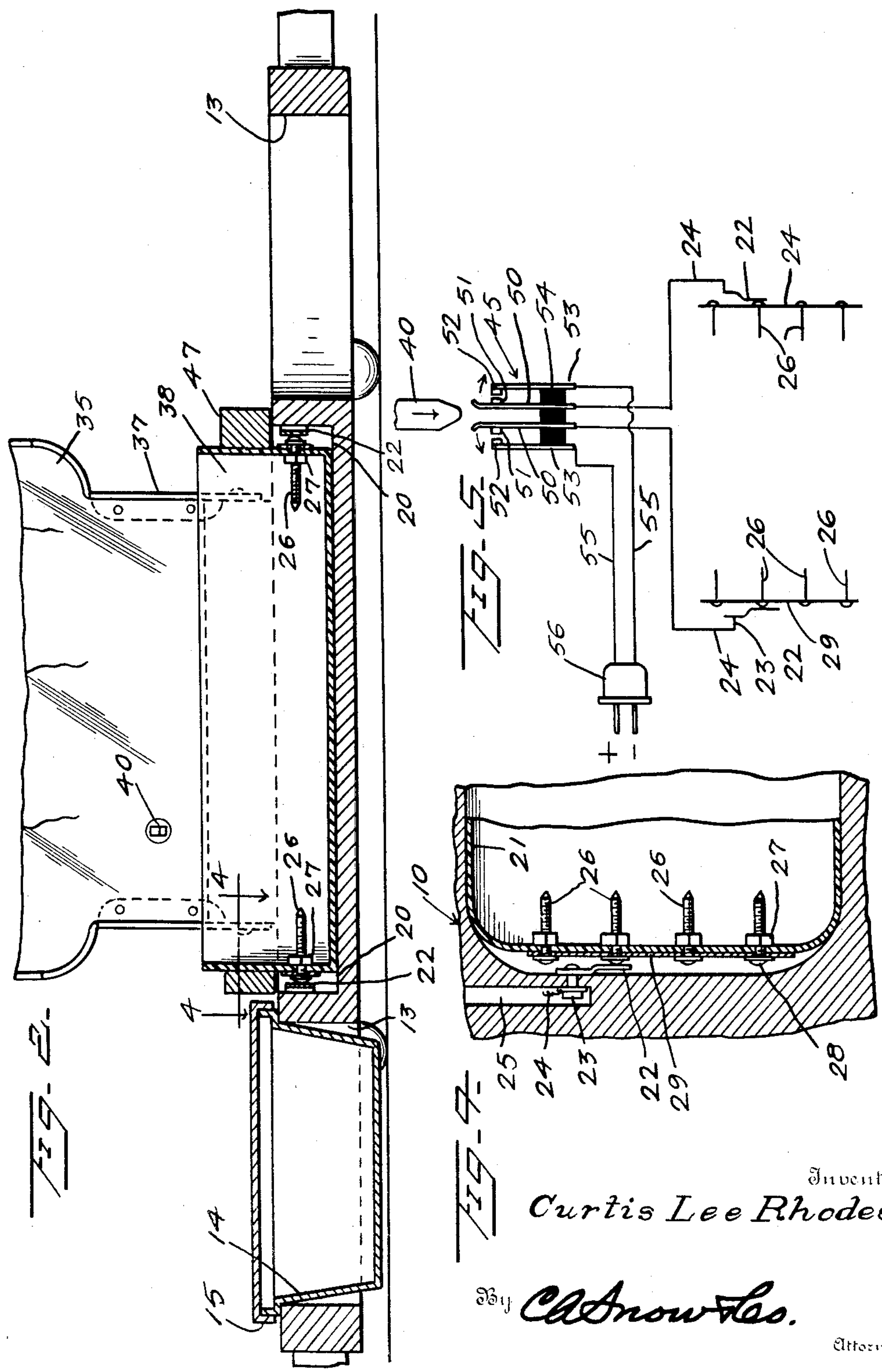
Inventor
Curtis Lee Rhodes
By C.A. Snow & Co.
Attorneys.

United States Patent Office 2,924,167 Patented Feb. 9, 1960

2,924,167

APPARATUS FOR COOKING WIENERS OR THE LIKE

Curtis L. Rhodes, Ripley, W. Va.

Application July 18, 1958, Serial No. 749,429

1 Claim. (Cl. 99—358)

This invention relates to an apparatus for cooking wieners, and has as its primary object the provision of such a device wherein the wiener itself serves as a portion of an electrically conductive circuit, whereby the current passes directly through the wiener to achieve the cooking function.

An additional object of the invention is the provision of such a device wherein the cooking is accomplished in a tray to catch all the juices of the meat, the tray being readily removable from the device, and adapted to be used, if desired, as a serving tray.

An additional object of the invention is the provision of such a device provided with a cover or lid, and switch means associated with the lid, whereby closure of the lid will close an electric circuit through the wieners to cook the same, and opening of the lid will automatically discontinue the circuit.

Still another object of the invention is the provision of such a device incorporated in a serving tray, wherein removable cups are provided for the containing of relish, mustard, and the other accessories for serving wieners, in such a manner as to be readily accessible to the user of the tray.

Still another object of the invention is the provision of such a device which is sturdy and durable in construction, reliable and efficient in operation, and relatively simple and inexpensive to manufacture, assemble and utilize.

Other objects will in part be obvious and in part be pointed out as the description of the invention proceeds, and shown in the accompanying drawings wherein there is disclosed a preferred embodiment of this inventive concept.

In the drawings:

Figure 1 is a top plan view of one form of device incorporating features of the instant invention.

Figure 2 is an enlarged sectional view taken substantially along the line 2—2 of Figure 1 as viewed in the direction indicated by the arrows.

Figure 3 is an enlarged sectional view taken substantially along the line 3—3 of Figure 1 as viewed in the direction indicated by the arrows.

Figure 4 is a fragmentary sectional view taken substantially along the line 4—4 of Figure 2 as viewed in the direction indicated by the arrows.

Figure 5 is a schematic wiring diagram showing electrical connections.

Figure 6 is an end elevational view of the tray element as removed from its supporting base or tray.

Similar reference characters refer to similar parts throughout the several views of the drawings.

Having reference now to the drawings in detail, there is generally indicated at 10 a base or tray, which may be provided with rubber feet 11, and end handles 12. Adjacent opposite ends of the tray are a plurality of recesses 13, in which are adapted to be positioned plastic cups 14 with covers 15, which are adapted to contain condiments such as relish or pickles or similar accessories customarily served with wieners.

In the center of the tray, which is preferably constructed of insulating material, such as wood or the like, is a substantially rectangular recess 20, within which is adapted to be positioned a plastic receptacle or tray 21. Positioned on opposite sides of the recess are opposed spring contact fingers 22, which are connected as by means of conductive rivets 23 or the like with wires 24, which extend through suitable bores or recesses 25 in the base 10. On each side of the tray 21 are positioned a plurality of metallic fingers or prongs 26 provided with pointed ends, each of which is secured in position by means of a clamping nut 27, and carries a head 28 on the outer side of the end wall of the tray 21. An elongated conductive strip 29 communicates all of the heads 28, and is adapted to be engaged by the spring finger 22, to establish an electrical connection between the wire 24 and each of the prongs or fingers 26. The arrangement is thus such that when a wiener W (see Fig. 1) is extended between two oppositely disposed contact fingers 26, it being noted that the fingers are arranged in oppositely disposed pairs, and an electrical circuit may be established directly through the meat to be cooked for the purpose of cooking the same.

A plastic lid 35 provided with a marginal flange 36 is adapted to overlie the tray 21, and includes lateral projections 37, which are suitably hinged on hinge pins 38 in a suitable recess 39 adjacent one side of the end of the tray 10. A projecting pin 40 extends through the top wall of the lid 35, being held in position by means of a lock nut 41, and is adapted to bridge the opposed contacts of a switch member generally indicated at 45 contained within a recess 46 in the top of a raised portion 47 of the tray. The recess is adapted to be closed by means of a cover plate 48 having an opening 49 therein. The switch 45 as best shown in Figure 5 includes a pair of upright prongs 50, oppositely disposed, which carry contacts 51. The contacts carried by the separable members 50 are adapted, when spread or separated by the insulating prong 40 to engage opposed contacts 52, which are carried by fixed spring fingers 53, which are mounted, together with the fingers 50 on an insulating block 54.

Each of the fingers 50 is connected to one of wires 24, which are as previously described connected with contact fingers 22, and thus an electrical association with the pins or fingers 26.

Each of the fingers 53 is correspondingly connected to a wire 55, the wires 55 extending to a contact plug 56, adapted to be inserted in an outlet receptacle to provide a source of current.

From the foregoing the use and operation of the device should now be readily understandable. When it is desired to use the device, the plug 56 is inserted in a suitable electrical outlet, the lid 35 being raised, and the wieners W extended between opposed pairs of prongs, pins or fingers 26.

The lid 35, is then closed, whereupon the insulating pin 40 extends through the opening 49, and bridges and separates the contact fingers 50 to close contacts 51 and 52, whereupon a circuit is established through the wires 24 and pins 26 through the wieners or hot dogs, to conduct electrical current therethrough, for the purpose of cooking the same.

After the cooking operation has been completed, the lid is raised, breaking the circuit, and the cooked wieners removed, as by means of tongs, or in any other desired manner and ready to serve.

Obviously if desired the entire tray 21 may be removed by means of handles 60, positioned at opposite ends of the tray, and the wieners served directly in the plastic receptacle or tray 21.

From the foregoing it will now be seen that there is herein provided an improved wiener cooker which accomplishes all of the objects of this invention, and others, including many advantages of great practical utility and commercial importance.

As many embodiments may be made of this inventive concept, and as many modifications may be made in the embodiment herein before shown and described, it is to be understood that all matter herein is to be interpreted merely as illustrative and not in a limiting sense.

What I claim is:

In a device of the character described, a supporting base having a recess therein, an electrical contact on each of two opposite sides of said recess, a removable non-conductive tray in said recess, a plurality of opposed pairs of electrical conductive contact prongs projecting interiorly of said tray, from opposite sides thereof, the prongs of each pair being adapted to be bridged by a wiener to close an electrical current through the wiener for cooking the same, means establishing electrical contact between the prongs on each side of said tray, and the associated electrical contact on the adjacent side of the means, means connecting said electrical contacts with a source of electricity, and switch means in said last mentioned means, said switch means including a pair of separable contact arms movable to engage a pair of fixed contact arms and said actuating member including an insulating projection insertable between said separable contact arms to move said separate contact arms to engagement with said fixed contact arms.

References Cited in the file of this patent

UNITED STATES PATENTS

| | | |
|---|---|---|
| 2,013,205 | Falk | Sept. 3, 1935 |
| 2,052,919 | Brogdon et al. | Sept. 1, 1936 |
| 2,083,717 | Kohn | June 15, 1937 |
| 2,269,178 | Breneman | Jan. 6, 1942 |
| 2,299,088 | Griffith | Oct. 20, 1942 |
| 2,310,723 | Whitchurch | Feb. 9, 1943 |